J. DANA.
CUSHION TIRE FOR VEHICLES.
APPLICATION FILED JUNE 13, 1912.
1,059,122.
Patented Apr. 15, 1913.
2 SHEETS—SHEET 1.
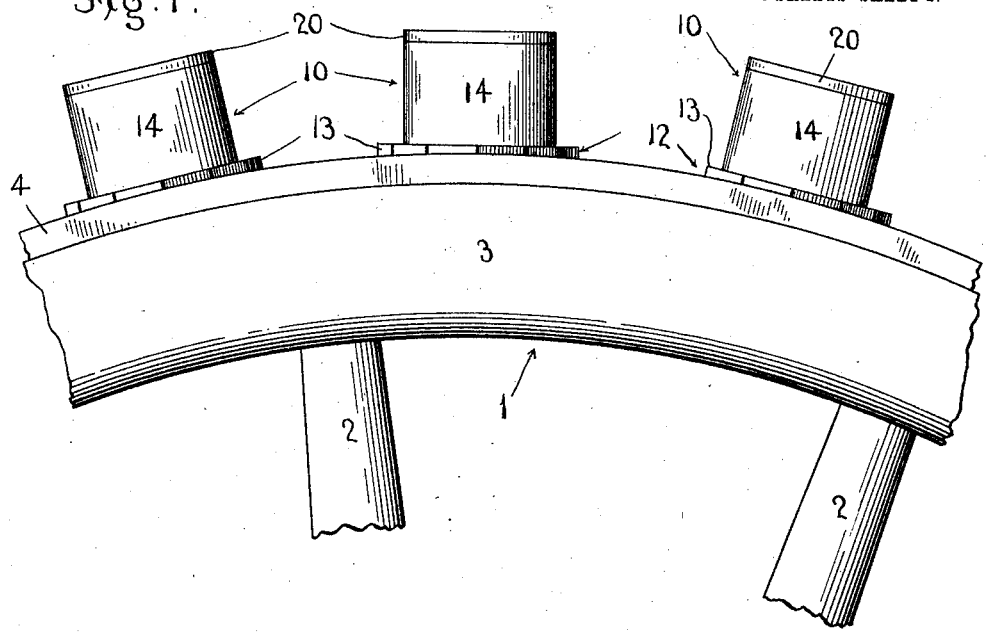
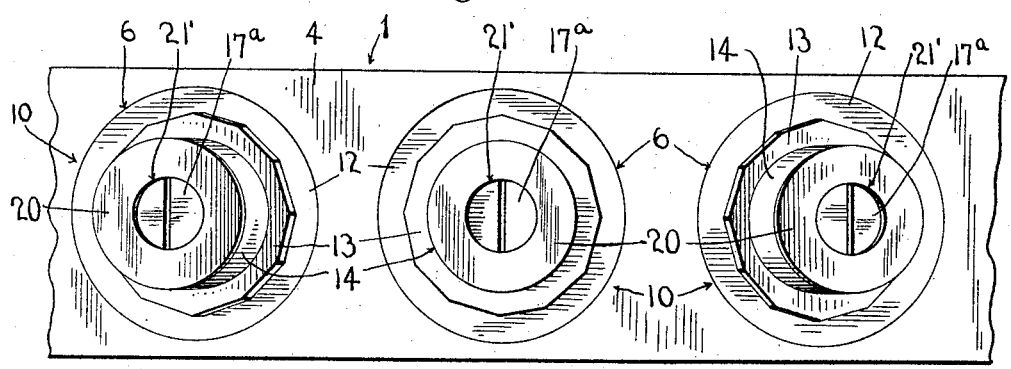
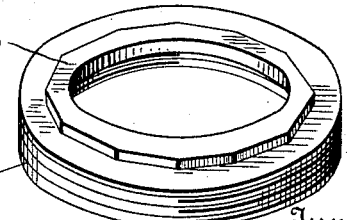
Witnesses
L. B. James
S. M. McColl
Inventor
John Dana
by H. B. Willson &co
Attorneys J. DANA.
CUSHION TIRE FOR VEHICLES.
APPLICATION FILED JUNE 13, 1912.
1,059,122.
Patented Apr. 15, 1913.
2 SHEETS—SHEET 2.
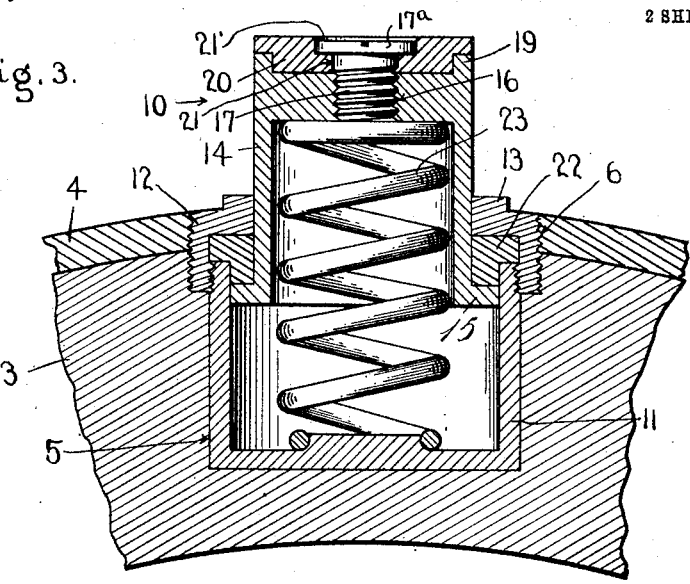
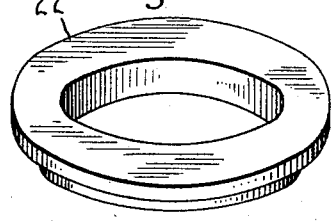
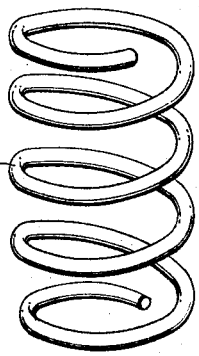
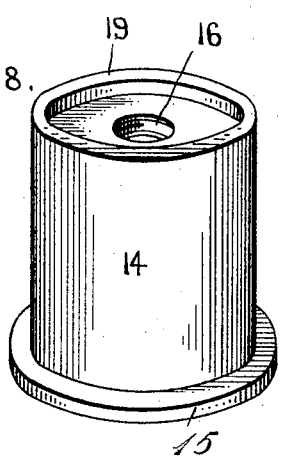
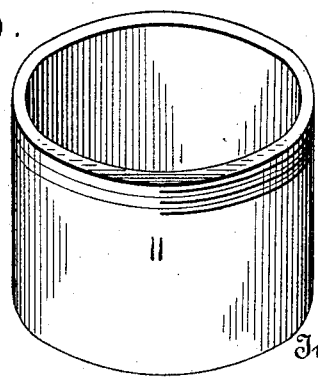
Witnesses
L. B. James
S. M. McColl
Inventor
John Dana
by H. B. Willson &co
Attorneys

UNITED STATES PATENT OFFICE.

JOHN DANA, OF BURWELL, NEBRASKA.

CUSHION-TIRE FOR VEHICLES.

1,059,122.     Specification of Letters Patent.     Patented Apr. 15, 1913.

Application filed June 13, 1912. Serial No. 703,532.

*To all whom it may concern:*

Be it known that I, JOHN DANA, an applicant through application to become a citizen of the United States, residing at Burwell, in the county of Garfield and State of Nebraska, have invented certain new and useful Improvements in Cushion-Tires for Vehicles; and I do declare the following to be a full, clear, and exact description of the invention, such as will enable others skilled in the art to which it appertains to make and use the same.

This invention relates to improvements in resilient tires for vehicle wheels constructed to provide an effective substitute for the ordinary pneumatic tire so far as resiliency or cushioning effect is concerned, and which has exceptional durability, and can be repaired in any portion thereof without effecting the remaining portions of the wheel or tire.

The principal object of the invention is to provide a novel construction of resilient vehicle tire of purely mechanical construction and operation in producing the resilient effects.

A further object of the invention is to provide a simple, durable, strong and efficient construction of mechanical, resilient vehicle tire having means whereby it may be readily converted into an anti-skidding tire when desired.

Other objects of the present invention not at this time particularly enumerated will be clearly understood from the following detailed description, as set forth hereinafter and claimed.

In the accompanying drawings: Figure 1 is a side elevation of a portion of a wheel equipped with this improved tire. Fig. 2 is a top plan view thereof. Fig. 3 is a vertical section thereof. Figs. 4 to 10 inclusive are detail views of the separate parts entering into the construction of the invention. Fig. 11 is a detail view of the removable anti-skidding element employed when desired.

The invention as shown is applicable to what may otherwise be regarded as a common form of vehicle wheel 1 having spokes 2, a wooden or equivalent felly 3 and a steel felly band 4, the width of the tread of which corresponds to the kind of vehicle in connection with which the invention is to be employed, and it may be assumed that an automobile wheel is the type under present consideration.

In carrying out the invention, a special construction of both felly and felly band are employed, or the felly band and felly of an ordinary wheel may be modified to adapt them for use with this invention, a series of sockets 5 being formed in said felly which communicate with openings 6 in the metal felly band 4, said openings 6 being larger than the sockets 5 for a purpose to be described. These sockets and openings 5 and 6 are formed in the felly and its band at uniform intervals and in such relatively near relation as to receive the tire units or settings to be arranged in said openings substantially as shown, and constituting together a complete working tire affording a continuity of tread, like ordinary tires. The said several tire units or members 10 are alike in construction and operation, hence a description of one applies equally to all.

Each of the tire units 10, one of which is designed to be inserted in the sockets 5 and openings 6, comprises a cylindrical tubular member 11 closed at one end and having its opposite end exteriorly threaded to receive a bushing 12 which is interiorly threaded to engage the threaded end of the member 11 and exteriorly threaded for engagement with the opening 6 of the tire 4, said opening being threaded to receive said bushing. The bushing 12 has its upper end reduced and provided with an exteriorly disposed collar 13 preferably formed integral therewith and shaped to receive a wrench whereby the bushing may be readily applied and removed. Another tubular cylindrical member 14 of smaller size than the member 11 and mounted to slide in said member 11 forms the upper half of a spring casing, the lower half being formed by the member 11. This tubular member 14 has a laterally extending flange 15 on its lower or inner end, the periphery of which slidably engages the inner wall of the member 11, as shown clearly in Fig. 2. The upper end of the member 14 is closed and has a centrally disposed threaded aperture 16 for the reception of a screw 17 which is detachably engaged therewith. The member 14 is provided at its upper end with an upwardly projecting annular flange 19, which forms a seat for a tread member 20. This member 20 may be formed of rubber or any suitable material and has a centrally disposed aperture 21 which registers with the aperture 16 in the member 14 and through which the shank of the screw 17 is designed to pass. An annular recess or seat 21 is formed in the upper face of the washer 20 around the opening therein, and is designed to form a seat for the head 17$^a$ of the screw 17 to provide for the arrangement of the outer or upper face of said screw head flush with the outer face of the member 20 as shown clearly in Figs. 1 and 2. This screw head 17$^a$ is provided with the usual kerf to provide for the use of a screw driver in connection therewith.

A rubber packing 22 is arranged between the bushing 12 and the upper edge of the member 11 and the flange 15 of the member 14, as shown clearly in Fig. 3, said packing being recessed in its lower outer edge to fit over the edge of the member 11 and provide a water tight connection between said bushing and the members 11 and 14 of the spring casing or housing.

Housed within the casing formed by the members 11 and 14 is a heavy coiled wire spring 23 which forms a cushioning member for the outer tubular member 14 of the casing and yields when pressure is exerted on said member 14 such as is produced by the engagement of such member with the supporting surface over which the wheel passes to which said member is applied. It is obvious that the tension of this spring may be varied to suit the wheel to which it is to be applied, and may accordingly be made stronger or weaker according to the weight of the vehicle on which the wheel is used, and the casing may be readily opened and a lighter or heavier spring inserted whenever desired, or a new one inserted when one becomes broken, without in any way interfering with the other tire units.

When it is desired to use an anti-skidding tire the screws 17 may be removed from the several tire units and anti-skidding elements 24 such as are shown in Fig. 11 may be substituted. These elements 24 are made substantially like the screws 17, the head thereof only being different, said heads being each equipped with a cone-shaped projection 25 which extends beyond the outer face of the member 20 and forms a spur which will penetrate the ice or engage other slippery surfaces and prevent the wheel from slipping. In the application of these tire units 10, the parts are assembled in the position shown in Fig. 2 and the complete unit is inserted in one of the sockets 5 of the felly, and the bushing 12 of said unit is screwed into engagement with the screw threaded opening 6 of the band 4. After the tire units have been inserted in all of the sockets of the felly the wheel is complete and ready for use, and should one of said units become injured or worn out it may be readily removed and another substituted therefor, or any part of a unit may be replaced without in any way interfering with the others.

This improved tire is constituted by the series of units 10 which operatively replace a continuous tire like the ordinary pneumatic tire, and said units are separate, complete articles of manufacture and are supplied to the trade as such.

I claim as my invention:

As an article of manufacture a unitary member of a spring cushion tire consisting of a casing composed of slidably connected tubular sections of different diameters, the inner ends thereof being open and the outer ends closed, the larger section of said casing being exteriorly threaded, the smaller section having an annular outturned flange on its inner end slidably engaged with the inner face of said larger section, a bushing interiorly threaded at one end to engage the threaded end of the larger casing section and exteriorly threaded for engagement with an opening in the felly band and felly to which it is applied, said bushing having its outer end reduced to snugly fit said smaller casing section, a packing ring arranged between said bushing, the upper edge of said larger casing section and the flange of the smaller casing section, and a coiled spring arranged in said casing and bearing on the closed ends of said sections.

In testimony whereof I have hereunto set my hand in presence of two subscribing witnesses.

JOHN DANA.

Witnesses:
 CHAS. CHINN,
 JAMES C. WISDA.